United States Patent [19]
Johnson

[11] Patent Number: 5,275,760
[45] Date of Patent: Jan. 4, 1994

[54] GELLED CORROSION INHIBITION METHOD

[75] Inventor: John D. Johnson, Sugar Land, Tex.

[73] Assignee: Nalco Chemical Company, Naperville, Ill.

[21] Appl. No.: 936,750

[22] Filed: Aug. 27, 1992

[51] Int. Cl.$^5$ .............................................. C23F 11/18
[52] U.S. Cl. ......................... 252/389.61; 252/389.62; 252/392; 252/396; 422/8; 166/902
[58] Field of Search ............. 252/389.54, 396, 389.61, 252/389.62, 392, 387; 422/14, 16,8; 106/14.14, 14.26, 14.27; 166/902

[56] References Cited

U.S. PATENT DOCUMENTS

| | | | |
|---|---|---|---|
| 3,125,124 | 3/1964 | Daniels et al. | 264/269 |
| 3,192,955 | 7/1965 | Buck et al. | 138/140 |
| 3,280,848 | 10/1966 | Poettmann | 138/145 |
| 3,335,554 | 8/1967 | Grichnik | 56/119 |
| 3,336,554 | 8/1967 | Hatton | 138/144 |
| 3,843,374 | 10/1974 | Kurtis et al. | 106/14.34 |
| 4,121,842 | 10/1978 | Lacy | 277/112 |
| 4,885,880 | 12/1989 | Sudrabin et al. | 52/169.6 |
| 4,921,904 | 5/1990 | Sparapany et al. | 525/329.9 |
| 4,950,692 | 8/1990 | Lewis et al. | 521/45 |
| 4,970,267 | 11/1990 | Bailey et al. | 525/344 |
| 5,045,263 | 9/1991 | Palazzo | 264/137 |
| 5,122,544 | 6/1992 | Bailey et al. | 521/40 |

FOREIGN PATENT DOCUMENTS

| | | |
|---|---|---|
| 957910 | 11/1974 | Canada . |
| 1248344 | 10/1984 | Canada . |
| 289285 | 4/1991 | German Democratic Rep. . |
| 57-195993 | 12/1982 | Japan . |
| 58-071379 | 7/1983 | Japan . |
| 60-059081 | 8/1985 | Japan . |
| 62-031794 | 10/1987 | Japan . |

OTHER PUBLICATIONS

"Old Oilfield Procedure Offer Corrosion Protection for Buried Pipelines", IMC Drilling MUD Inc. (Feb. 1972) pp. 70-72.
"Corrosion Prevention for Cooling System-by Addn of Corrosion Inhibitor and Readily Gelling Water Soluble Polymer to Maintain Water above 6.5".
Hamlin, A. W., *W. Va. University Bulletin*, Ser. No. 79 N.11-1, May 1979, pp. 157-161 (abstract).
Acosta, D., Oil Gas Journal, 79(9), Mar. 2, 1981, pp. 83-86. (abstract).
*Materials Protection and Performance*, 11(1), Jan. 1972, pp. 42-43.
In re Clay, 23 USPQ2d, (Fed. Cir.), 1058 1061, Jun. 10, 1992.
Gaudioso, C. P. et al. *AIChE. Spring National Meeting.* (Houston Mar. 24-28, 1985). (abstract).
*Anti-Corrosion Methods and Materials*, 34(4), Apr. 1987, p. 12. (abstract).
*Oil and Gas Journal*, 86(17), Apr. 25, 1988, p. 41. (abstract).
Alexander R. A., *1988 OTC* (Houston May 2-5, 1988); Journal of Petroleum Technology, 42(1), Jan. 1990, pp. 62-66. (abstract).
Akstinat, M. H., *Erdoel Kohle, Erdgas, PetroChem., Brennst.-Chem.*, 38(3), Mar. 1985, pp. 114-119. (abstract).
Bour, D. L., *SPEIADC Drilling Conf.* (Dallas Feb. 28– Mar. 2, 1988), Proc. N. 17259, pp. 653-658. (abstract).
McCabe, C., Ocean Industry, 25(9), Nov. 1990, pp. 19-23. (abstract).

Primary Examiner—Robert L. Stoll
Assistant Examiner—Valerie Fee
Attorney, Agent, or Firm—Robert A. Miller; Daniel N. Lundeen; Andrew S. Pryzant

[57] ABSTRACT

A method of corrosion inhibition using a gelled inhibitor is disclosed. The method comprises consecutively introducing into an annular region of a jacketed pipeline a hydrogel slurried in an environmentally innocuous oil medium and a corrosion inhibitor dissolved in an aqueous medium. The liquid media are contacted to form a gelled corrosion inhibitor in the annulus. The method is particularly useful in buried pipelines where corrosion monitoring is difficult.

19 Claims, No Drawings

GELLED CORROSION INHIBITION METHOD

FIELD OF THE INVENTION

The present invention relates to a method of corrosion inhibition employing a substantially aqueous based gelled corrosion inhibitor.

BACKGROUND OF THE INVENTION

Pipeline systems are widely used in the long distance transmission of various fluids such as petroleum and natural gas products and can be laid above and/or below ground. Since pipelines are typically exposed to weathering, corrosion is a major problem which must be handled. Generally, corrosion monitors are used and regular physical inspections are undertaken according to need. In certain instances, however, physical inspection is often difficult, particularly when the line is wholly or partially underground. Leaks are particularly undesirable, especially when hazardous chemicals are transported and land adjacent the pipeline is developed.

Corrosion can result when moisture from the surrounding environment comes in contact with the surface of the pipeline. This is a particularly acute problem in warm, humid regions where rainfall is high and temperature differentials between the transported material and ambient can cause moisture condensation on the pipeline surface.

Efforts to prevent moisture-related corrosion have typically employed a hydrophobic coating such as oil applied to the exterior surface of the pipeline to form a waterproof barrier. In addition, the oil can be gelled to prevent coating loss.

*Materials Protection and Performance* 11(1):42–43, *Pipeline Gas Journal*, January, 1972, describes the use of gelled fuel oil as a corrosion barrier coating. A buried pipeline was reportedly repaired and further corrosion inhibited by inserting a new, smaller-diameter pipe inside the old corroded pipeline, and pumping a high viscosity fuel oil containing a gelling agent and a pH control agent into the annulus between the old and new pipe. The fuel oil was gelled to a consistency of a heavy grease.

The use of petroleum-based barriers, however, has several drawbacks. For one thing, the mixture is relatively viscous and difficult to pump. For another, oil-based fluids are undesirable from an environmental perspective. In addition, the gelled oil is difficult to remove from the annulus if it becomes necessary to undertake a repair or dispose of the line.

Accordingly, there is a need for a method of inhibiting corrosion in a pipeline which uses a non-oil based, environmentally acceptable corrosion inhibitor, which can be pumped at a low viscosity, but will not leak or run after being put in place, and which, optimally, would be readily removable to facilitate repair and disposal.

SUMMARY OF THE INVENTION

The present invention provides a method of inhibiting corrosion in a pipeline by employing a gelled corrosion inhibitor in an annular region between a casing and the pipeline. In contrast to ordinary practice in the art, the corrosion inhibitor is substantially water-based and environmentally acceptable. For purposes of maintenance, the gel viscosity can be reduced for easy removal from the annular region.

In one embodiment, the present invention provides a method of corrosion inhibition for a jacketed container. In one step, a particulated hydrogel-forming polymer is introduced into an annular region between the jacket and the container. As another step, an aqueous solution of a corrosion inhibitor is also introduced into the annular region, wherein the polymer is contacted by the aqueous inhibitor solution. The present method is particularly useful in an encased pipeline which is substantially horizontal.

As a preferred embodiment, the method includes the steps of mixing the polymer with a low viscosity oil to form a slurry and pumping the slurry into the annular region. The mixing step preferably includes concurrently feeding the oil and the polymer into a centrifugal pump wherein the slurry is produced by turbulence adjacent the pump impeller. The oil is preferably mineral oil and the slurry is preferably from about 5 to about 20 percent by volume of the annular region. The slurry preferably has from about 10 to about 50 percent by weight particulated polymer and a viscosity of less than 1000 centipoise at room temperature, and more preferably from about 30 to about 50 weight percent polymer particles and a room temperature viscosity of less than 800 centipoise. The hydrogel is preferably a lightly crosslinked, substantially water insoluble acrylic polymer. The acrylic polymer is preferably crosslinked by a polyamine.

The aqueous solution comprises from about 80 to about 95 percent by volume of the annular region. The aqueous solution can contain the corrosion inhibitor at an amount of from about 1 weight percent to about saturation weight and has a pH of about 7 or greater. The corrosion inhibitor preferably comprises a mild base such as sodium carbonate. As an additional anticorrosion ingredient, the aqueous inhibitor can also include a biocide to suppress bacterial growth.

In another embodiment, the present invention provides a substantially aqueous-based gelled corrosion inhibitor. The corrosion inhibitor is particularly useful in an annular region of a jacketed horizontal pipeline. The inhibitor comprises from about 5 to about 20 percent by volume of an oil dispersed in from about 80 to about 95 percent by volume of a gelled aqueous corrosion inhibitor solution having a pH of from about 8 to about 13; and a sufficient amount of a hydrogel-forming polymer to gel the aqueous solution. The hydrogel-forming polymer is a substantially water insoluble, lightly crosslinked acrylic or acrylic derivative polymer. The oil preferably comprises an environmentally innocuous material such as mineral oil. The corrosion inhibitor preferably comprises sodium carbonate.

DETAILED DESCRIPTION OF THE INVENTION

External corrosion of a pipeline is substantially inhibited by a gelled corrosion inhibitor. The inhibitor occupies an annular region of a jacketed pipeline and coats an exterior surface of the pipe. The corrosion inhibitor is primarily water-based for environmental safety and the gel can be reversible for easy removal if maintenance is needed.

The present method is particularly useful in buried pipelines where corrosion monitoring is difficult and a long-term service requirement is very important. Alternatively, the present invention can be used in an existing pipeline having an impaired integrity by inserting new, smaller-diameter pipe and filling the annulus with the corrosion inhibitor using the present method.

The present invention comprises admixing a gelling agent slurried in a first liquid medium and a corrosion inhibitor dissolved in a second liquid medium, wherein the gelling agent forms a gel in the second liquid medium. The liquid components are consecutively introduced into an annular region of a jacketed container to inhibit corrosion of the container. The gel forms a corrosion-inhibiting barrier coating adjacent an exterior surface of the container. As a result, the oxidation processes which corrode and weaken a metal surface are inhibited.

As used herein, slurry means a particulated solid wetted and dispersed in a liquid medium. A gel is referred to herein as a colloidal solution of a liquid in a solid.

The gelling agent is preferably pumped into the annular region as a slurry or suspension in a suitable liquid carrier.

Preferred gelling agents in the present method are water insoluble, hydrogel-forming materials—"hydrogels" which are activated by an absorption of water. As an alternative, the gelling agent can be activated in an alcohol—"alcogel" or other similar polar solvents. Both natural and synthetic hydrogels are known. Examples of natural hydrogels include protein based gelatin, polysaccharides, such as galactomannan gums (guar) and glucomannan gums, cellulose derivatives, and the like.

Examples of synthetic hydrogels include water insoluble acrylic polymers and acrylic derivative polymers which are also known in the art as super absorbent polymers (SAP). Acrylic polymers include polymers of one or more $\alpha,\beta$-ethylenically unsaturated carboxylic acids such as acrylic and methacrylic acid; unsaturated dicarboxylic acids such as maleic acid, itaconic acid, citraconic acid, and the like; and anhydrides thereof such as maleic anhydride. Examples of acrylic derivative polymers include polymers of alkali metal neutralized $\alpha,\beta$-ethylenically unsaturated carboxylic acids and alkyl esters thereof. These materials are rendered water-insoluble by crosslinking to a slight degree using a crosslinking agent such as conventional di- or poly-functionalized amine materials. Examples of suitable di- or poly-functionalized amines include ethylenediamine, 1,4-diaminebutane, 1,8-diamineoctane, diethylenetriamine, tetraethylenepentaamine, and the like. The crosslinking agent typically comprises from about 0.001 to about 10 percent by mole of the crosslinked polymer.

Preferred acrylic or acrylic derivative polymer gelling agents are substantially water-insoluble, slightly crosslinked, highly absorbent hydrogel-forming polymeric compositions comprising the partially neutralized reaction product of a water soluble acrylic polymer and one or more water soluble poly-functional amines. Additional information regarding such preferred acrylic or acrylic derivative polymer gelling agents and superabsorbent polymer fines can be found in U.S. Pat. Nos. 4,921,904 to Sparapany et al.; 4,950,692 to Lewis et al.; and 4,970,267 and 5,122,544 to Bailey et al.; which are hereby incorporated herein by reference.

Acrylic or acrylic derivative polymer gelling agents are generally made by several well known processes including bulk, emulsion and gel polymerization. The polymer thus formed can, if necessary, be lightly crosslinked *in situ* and then dried.

The gelling agent in the present method is used as a finely divided powder to enhance wettability in the carrier medium and contacting in the aqueous medium. Acrylic or acrylic derivative polymer hydrogels can be pulverized into a powder by conventional techniques. Because such hydrogel powders have recently found widespread use in the manufacture of absorbent disposable baby diapers and pulverizing processes produce a fines byproduct generally unsuitable for disposable diaper manufacture, some attention as been devoted to finding a use for the fines. It has been found that such fines can be used in the present method and are available commercially from the Nalco Chemical Company, for example, under the trade designation N-1181.

The gelling agent is preferably carried as a slurry in a compatible but non-gelling medium. The carrier medium should wet the gelling agent and have a sufficient viscosity to suspend the gelling agent to a slurry consistency but not so viscous as to present excessive pumping difficulties. In addition, the carrier medium should have a lower density than the corrosion inhibitor solution to permit a degree of mixing due to density differences.

Oils are a suitable carrier medium. Examples of suitable oils include fixed oils such as glycerol esters fatty acids, lubricating oils, mineral oils, hydrocarbon oils such as crude petroleum, residual refinery oils from bottoms streams, diesel oil, fuel oil, and the like. In the present method, a food grade mineral oil is preferred due to low cost, low environmental toxicity and inert chemical properties.

The gelling agent is mixed into the carrier oil at a loading of from about 10 to about 50 percent solids, and preferably from 30 to about 50 percent solids. The viscosity of the slurry forms a practical upper limit on the solids content of the carrier oil. For ease of pumping, the slurry should have a viscosity less than 1000 cp at ambient, preferably 800 cp or less.

The second liquid medium is preferably a non-saline aqueous solution of the corrosion inhibitor. The corrosion inhibitor compound is an ionic compound which produces a basic pH in the aqueous medium. The corrosion inhibitor solution has a pH above about 7, and preferably between about 8 and 13. Examples of suitable corrosion inhibitor compounds are hydroxides, carbonates, bicarbonates, and the like of alkali and alkaline metals and ammonium. A preferred inexpensive corrosion inhibitor compound is sodium carbonate. The sodium carbonate typically comprises from about 1 percent by weight to saturation weight of the aqueous medium, and preferably from about 2 to about 10 percent by weight. The basic corrosion inhibitor is used in an amount sufficient to partially neutralize the acrylic or acrylic derivative polymer hydrogel and give a suitable pH to the aqueous medium.

The present corrosion inhibitor can further include optional components for varying purposes such as, for example, biocides, metal passivators, fillers, dyes, and the like. A representative example of a suitable biocide is glutaraldehyde. The biocide can be used in an amount of from 100 ppm to about 1000 ppm of the aqueous solution. A representative example of a suitable passivator is an amine salt of isoascorbic acid. The metal passivator can be used in an amount of from about 0.5 to about 2.5 percent by weight of the aqueous medium.

The present method can be used to inhibit corrosion of any jacketed container subject to external corrosion oxidation. A common example of one such container is a pipeline in a casing which is substantially horizontally laid down. Other such containers are jacketed vessels, jacketed fittings, and the like. It is understood that the container can have a jacket in an original design or a jacket can be added at a later time to effect corrosion protection by the present method. To jacket for repair an existing pipeline or pipeline section, a smaller diameter pipe can be inserted into the existing pipe run, for example, so that the existing pipe which has lost integrity due to corrosion becomes a casing for the new smaller diameter pipe. Spacers are generally used to support the pipes in a concentric arrangement. The repaired pipeline thus jacketed can have the present gelled corrosion inhibitor used in the annular region to inhibit further corrosion.

In the practice of the present invention, a slurry of the polymer hydrogel and mineral oil is prepared by feeding the polymer as a dry bulk powder into the mineral oil under agitation. Both components can be concurrently fed at the suction of a slurry pump having slurry producing agitation. A vertically placed centrifugal pump suction has been found to produce the best results.

Bulk powder handling equipment is readily available commercially from AccuRate Inc. of Wisconsin, for example, which makes semi-bulk bag discharge and metering systems for dry materials. Polymer dispersing equipment is available commercially from Norchem Industries of Illinois, for example, which manufactures high speed, high agitation centrifugal slurry pumps for polymer dispersement. The slurry thus prepared is pumped into the annular region of the pipeline to fill from about 5 to about 20 percent of the available volume, and preferably from about 5 to about 15 percent by volume.

Following the hydrogel-containing slurry, the unoccupied volume of the annular region is filled with the aqueous corrosion inhibitor solution prepared in a conventional manner by dissolving the corrosion inhibitor compound in water to produce a desired pH level. The corrosion inhibitor solution should be pumped onto the hydrogel slurry at a rate which avoids displacing the slurry from the annular region. Upon placement of the corrosion inhibitor, density differences between the oil medium and the aqueous solution buoys the oil layer and sinks the aqueous layer. Mixing resulting from the movement of the layers and migration of the dispersed polymer hydrogel to the surface of the oil layer assists contacting of the hydrogel with the aqueous layer. Contacting, over time, results in gelation of the aqueous layer adjacent the outer surface of the pipeline. Time required to gel the aqueous layer can vary from 12 to 48 hours depending on the ambient conditions, hydrogel content and the ratio of water to oil.

In the practice of the present method, the annular region of the pipeline can be filled with the gelled corrosion inhibitor in multiple gel layers or applications of the present method. Large diameter pipeline or containers, in particular, can require two applications or more. That is, a first portion of the annular space is filled with a first gel layer by introducing a first application of the hydrogel and the corrosion inhibitor solution. Following gelation, an additional portion of the annular region is filled with gel as a second gel layer and so on until the annular space is adequately filled with the gelled corrosion inhibitor. Large diameter pipelines are preferably filled with the gelled corrosion inhibitor in two or more applications of the present method.

The present gel inhibitor is preferably reversible. When the preferred superabsorbent polymer fines are used, addition of saline into the annular region having the gelled corrosion inhibitor will reverse the gel process. In such manner the corrosion inhibitor can be easily drained or otherwise displaced for conducting maintenance work on the pipeline, or for disposal of the pipeline.

The corrosion inhibitor and method is further illustrated by the following examples.

EXAMPLES 1-5 AND COMPARATIVE EXAMPLES 1-2

Corrosion tests using the present gelled corrosion inhibitor fluid were performed on mild steel coupons to determine the effect of pH on corrosion rate. For each test, a standard coupon (7.6 cm (3") length $\times$ 0.9 cm ($\frac{3}{8}$") width $\times$ 0.25 cm (1/16") thickness) was weighed and sealed inside a 4-ounce bottle containing a test fluid. The test bottles were placed in a hot room for 30 days. The temperature in the hot room was controlled at between 49°-54° C. At the end of the test period, the coupons were cleaned in acetone and reweighed to determine weight loss due to corrosion.

Test fluid, except in Example 5, was prepared by adding 10 ml of the hydrogel slurry mixture to a 100 ml graduated cylinder followed by 90 ml of 10 wt % aqueous isoascorbic acid amine salt (metal passivator). For Examples 1-4, sodium carbonate ($Na_2CO_3 \cdot H_2O$) was added until a pH meter gave a desired pH reading. Comparative Examples 1-2 contained no sodium carbonate inhibitor. The isoascorbic acid amine salt solution also contained glutaraldehyde (biocide) equal to 500 ppm overall concentration. The hydrogel slurry was prepared by blending 50 g of ARCOPAK 90 mineral oil obtained from Arco Chemical and 50 g of N-1181 polymer hydrogel in a Waring blender until homogenized. The test fluid in Example 5 consisted of 95 g of 3.2 weight percent aqueous $Na_2CO_3 \cdot H_2O$ solution and 5 g of the N-1181 polymer. Corrosion rate results are given in Table 1.

TABLE 1

| Example | pH | Weight Loss (mg) | Corrosion Rate ($\mu$py (mpy)) |
|---|---|---|---|
| Comp. 1 | 7.5 | 106 | 206.7 (8.1) |
| Comp. 2 | 7.5 | 102 | 203.2 (8.0) |
| 1 | 9 | 92 | 172.7 (6.8) |
| 2 | 10 | 48 | 94.0 (3.7) |
| 3 | 11 | 10 | 20.3 (0.8) |
| 4 | 12 | 0 | 0 |
| 5 | 3.2 wt % | 0 | 0 |

EXAMPLES 6-9

In the following examples, additional corrosion tests were performed on standard mild steel coupons using procedures similar to Examples 1-5 and Comparative Examples 1-2. The hydrogel slurry comprised 40 wt % N-1181 PAA hydrogel fines in 60 wt % ARCOPAC 90 mineral oil. The aqueous corrosion inhibitor solution comprised 94.875 wt % tap water, 4 wt % $Na_2CO_3 \cdot H_2O$, 1 wt % isoascorbic acid amine salt and 0.025 wt % glutaraldehyde. Test fluid composition and corrosion results are shown in Table 2.

TABLE 2

| Example | Fluid Composition (g) | | Corrosion Rate |
| --- | --- | --- | --- |
| | Slurry | Corrosion Inhibitor | ($\mu$py (mpy)) |
| 6 | 10 | 90 | 0.0 |
| 7 | 20 | 80 | 0.25 (0.01) |
| 8 | 30 | 70 | 1.3 (0.05) |
| 9 | 40 | 60 | 1.0 (0.04) |

EXAMPLE 10

The present corrosion inhibition method was demonstrated on a horizontal cased PVC pipe using the hydrogel slurry and corrosion inhibitor solution compositions described in Examples 5-8. The cased pipe was fabricated from 0.9 m (36") of nominal 5 cm (2") pipe sealed at both ends to an internal 4 cm (1.5") pipe. Four 6 mm (0.25" NPT) holes were drilled in the top and bottom surface of the 5 cm pipe at approximately 15 cm (6") from each end. The bottom holes were plugged and a slurry mixture made from 63 g hydrogel in approximately 100 g mineral oil was added to the casing through the top holes. The pipe was allowed to stand for 4 hours then approximately 1200 ml of the corrosion inhibitor was slowly added and the mixture was allowed to set over 24 hours. At the end of this time a gel layer had formed on the bottom of the casing with mineral oil floating on the top surface of the gelled layer. An additional quantity of slurry approximately equal to the first amount (63 g hydrogel/100 g mineral oil) was added and allowed to stand for 3 hours. Next, approximately 1200 ml of inhibitor solution was added until the casing was full. The pipe was allowed to stand over a weekend. The casing was completely filled with the gelled inhibitor so that there was no flow when the bottom plugs were removed. The pH of the gel at each of the casing holes was checked using pH paper and was in a range of 8-13.

The present corrosion inhibitor and method are illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

What is claimed is:

1. A method of corrosion inhibition, comprising the steps of:
    mixing a sufficient quantity of a particulated hydrogel-forming polymer with a pumpable oil to form a slurry;
    pumping the slurry into an annular region of a jacketed container;
    introducing an aqueous solution of a corrosion inhibitor into the annular region, wherein the polymer is contacted by a solution; and
    substantially completely gelling the inhibitor solution in the annular region.

2. The method of claim 1, wherein the oil comprises mineral oil.

3. The method of claim 1, wherein the mixing step includes concurrently feeding the hydrogel and the hydrocarbon into the pump, wherein pump agitation forms a slurry of the hydrogel in the hydrocarbon.

4. The method of claim 1, wherein the slurry comprises from about 5 to about 20 percent by volume of the annular region.

5. The method of claim 1, wherein the slurry comprises from about 5 to about 15 percent by volume of the annular region.

6. The method of claim 1, wherein the slurry comprises from about 10 to about 50 percent hydrogel solids and has a viscosity less than 1000 centipoise at room temperature.

7. The method of claim 1, wherein the slurry comprises from about 30 to about 50 percent hydrogel solids and has a viscosity less than 800 centipoise at room temperature.

8. The method of claim 1, wherein the jacketed container comprises a pipeline in a casing.

9. The method of claim 8, wherein the pipeline is substantially horizontally laid.

10. The method of claim 1, wherein the polymer comprises super absorbent polymer fines.

11. The method of claim 1, wherein the polymer comprises a substantially water insoluble, slightly crosslinked acrylic or acrylic derivative polymer.

12. The method of claim 11, wherein the polymer is slightly crosslinked acrylic or acrylic derivative polymer fines.

13. The method of claim 11, wherein the acrylic or acrylic derivative polymer is slightly crosslinked by a polyamine crosslinking agent.

14. The method of claim 1, wherein the corrosion inhibitor solution is introduced in an amount of from about 80 to about 95 percent by volume of the annular region.

15. The method of claim 1, wherein the aqueous solution has a pH of about 7 or greater.

16. The method of claim 1, wherein the corrosion inhibitor comprises a mild base.

17. The method of claim 1, wherein the aqueous solution includes a biocide.

18. A gelled corrosion inhibitor in an annular region of a jacketed container, comprising:
    from about 5 to about 20 percent by volume of an oil;
    dispersed in from about 80 to about 95 percent by volume of a gelled aqueous corrosion inhibitor solution having a pH of from about 8 to about 13; and
    a sufficient amount of hydrogel to gel the aqueous solution, wherein the hydrogel is a substantially water insoluble, slightly crosslinked acrylic or acrylic derivative polymer.

19. The method of claim 1, wherein the polymer slurry is pumped into the annular region prior to the aqueous corrosion inhibitor introduction step.

* * * * *